June 1, 1926.

D. BASCH ET AL 1,587,362

COMPOSITE METAL ARTICLE

Filed Feb. 2, 1925

Inventors:
David Basch,
George B. Gerhart,
by
Their Attorney.

Patented June 1, 1926.

1,587,362

UNITED STATES PATENT OFFICE.

DAVID BASCH, OF SCHENECTADY, NEW YORK, AND GEORGE B. GERHART, OF GOVANS-TOWN, MARYLAND, ASSIGNORS TO GENERAL ELECTRIC COMPANY, A CORPORATION OF NEW YORK.

COMPOSITE-METAL ARTICLE.

Application filed February 2, 1925. Serial No. 6,203.

The present invention relates to the production of articles of copper or of copper alloys and in particular to articles having an outline which is not well adapted for manufacture by such processes as extrusion, forging, rolling, etc. and which at the present time are produced by casting.

It is the object of our invention to improve the strength and soundness of such articles and also to simplify and cheapen the method of manufacture.

In accordance with our invention articles of this character, for example, members for electrical apparatus, are constituted in part of wrought metal and in part of cast metal, the wrought and cast metal being bonded to each other by an interjacent layer of alloy into a solid, unitary body.

Figure 1:
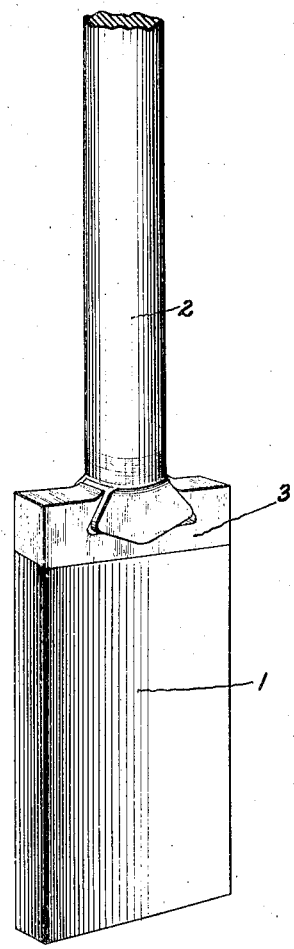
Figure 2:
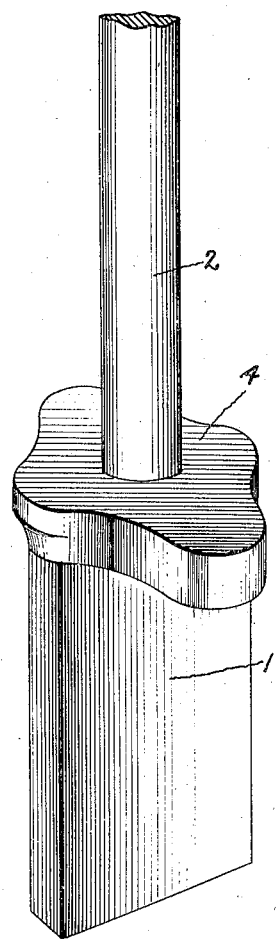

Our invention may be better understood by reference to the accompanying drawing which illustrates in Fig. 1, the first step of the manufacture of a member of a disconnecting switch and in Fig. 2 shows the completed article.

The member of the disconnecting switch shown in Fig. 1 comprises a blade 1 consisting of rolled copper into the notched end of which is inserted the flattened head of a rod 2, also consisting of rolled copper. These two parts are locked together into the position shown by cold forging. Either before or after assembly, the interlocked members are coated adjacent the junction with a layer of a metal of lower melting point, which is readily alloyable with copper. For example, a layer of solder or tin 3 may be applied by well understood methods. I have used with success a solder consisting of equal parts by weight of lead and tin which may be applied with a flux in the usual way.

The tinned article is placed in a mold and copper, or copper alloy, is cast about the tinned region as indicated at 4, in Fig. 2. The cast metal does not need to be heated much above the melting point. Immediate alloyage of the cast metal and the film of solder, or other bonding metal occurs producing a layer of bronze which unites with and bonds together the molten cast metal and the solid wrought metal to form a unitary article. As distinguished from the so-called "burning-on" process, whereby a union of fluid and solid metal is produced by supplying sufficient heat by the cast metal to partly melt the solid metal, the wrought metal parts united in accordance with this invention with cast metal, are not subjected to fusion, as the configuration of the imbedded parts of solid wrought metal are perfectly preserved. The layer of copper alloy produced at the junction of the cast and wrought metal is hard and sound and cannot be separated by service stresses from the adjoining substantially unalloyed metal.

Our invention is applicable not only to the manufacture of articles of wrought and cast copper but also to articles consisting of brasses, bronzes or other copper alloys or partly of copper, or partly of a copper alloy.

The device herein shown and described is illustrative only and shows one particular simple device embodying the principle of our invention which, however, is capable of being utilized in the manufacture of a wide variety of devices. For example, end rings may be formed by casting copper upon the tinned ends of copper conductor bars.

What we claim as new and desire to secure by Letters Patent of the United States, is:—

1. A composite metal article comprising a member of wrought cupreous metal, a member of cast cupreous metal and a bonding layer of alloy uniting said members.

2. A composite metal article comprising one or more members of wrought copper and one or more members of cast copper, said members being integrally united by an interjacent layer or layers of copper alloy.

3. A composite metal article comprising a member of wrought copper, a member of cast copper and a bonding layer of a tin alloy of copper.

4. The method of uniting parts of wrought cupreous metal with a casting of cupreous metal which consists in coating the wrought metal with a metal easily alloyable with copper and then bringing the cast metal into contact with the coated surface, thereby producing at the coated surface a bonding layer of alloy which unites the wrought and cast metal.

In witness whereof, DAVID BASCH has hereunto set his hand this 26th day of January, 1925, and GEORGE B. GERHART has hereunto set his hand this 28 day of Jan., 1925.

DAVID BASCH.
GEORGE B. GERHART.